(12) United States Patent  
Arvo

(10) Patent No.: US 9,092,267 B2
(45) Date of Patent: Jul. 28, 2015

(54) MEMORY SHARING IN GRAPHICS PROCESSING UNIT

(75) Inventor: Jukka-Pekka Arvo, Raisio (FI)

(73) Assignee: QUALCOMM Incorporated, San Diego, CA (US)

( * ) Notice: Subject to any disclaimer, the term of this patent is extended or adjusted under 35 U.S.C. 154(b) by 756 days.

(21) Appl. No.: 13/164,615

(22) Filed: Jun. 20, 2011

(65) Prior Publication Data

US 2012/0320070 A1 Dec. 20, 2012

(51) Int. Cl.
*G06T 1/00* (2006.01)
*G06F 9/50* (2006.01)

(52) U.S. Cl.
CPC .................................. *G06F 9/5033* (2013.01)

(58) Field of Classification Search
CPC . G06F 9/3887; G06F 9/3851; G06F 15/8007; G06F 8/45; G06F 9/3828; G06T 1/00
USPC .......................................... 345/501–505, 522
See application file for complete search history.

(56) References Cited

U.S. PATENT DOCUMENTS

| 5,757,385 A * | 5/1998 | Narayanaswami et al. ... 345/505 |
| 7,728,841 B1 | 6/2010 | Nordquist et al. |
| 2008/0189524 A1 | 8/2008 | Poon et al. |
| 2009/0219288 A1 | 9/2009 | Heirich |
| 2009/0251476 A1 | 10/2009 | Jiao et al. |
| 2009/0300621 A1 * | 12/2009 | Mantor et al. ................. 718/100 |
| 2010/0149185 A1 | 6/2010 | Capewell et al. |
| 2010/0315428 A1 * | 12/2010 | Curry et al. .................... 345/543 |
| 2011/0122135 A1 * | 5/2011 | Kim et al. ...................... 345/426 |
| 2012/0096474 A1 * | 4/2012 | Jiao .............................. 718/107 |
| 2012/0297163 A1 * | 11/2012 | Breternitz et al. ............. 712/22 |

FOREIGN PATENT DOCUMENTS

| JP | 2009520307 A | 5/2009 |
| WO | 2007111743 A2 | 10/2007 |
| WO | 2011017026 A1 | 2/2011 |
| WO | 2011028981 A1 | 3/2011 |

OTHER PUBLICATIONS

International Search Report and Written Opinion—PCT/US2012/038659, International Search Authority—Oct. 8, 2012, 14 pp.

(Continued)

*Primary Examiner* — Ke Xiao
*Assistant Examiner* — Kim-Thanh T Tran
(74) *Attorney, Agent, or Firm* — Shumaker & Sieffert, P.A.

(57) ABSTRACT

Aspects of this disclosure are directed to a method of processing data with a graphics processing unit (GPU). According to some aspects of the disclosure, the method comprises receiving input defining execution orders for a shader processor, wherein the execution orders comprise a plurality of kernel designations and a plurality of workgroup designations. The method may also include assigning workgroups of kernels identified in the plurality of workgroup designations and the plurality of kernel designations to the shader processor. The method may also include executing, by the shader processor, the workgroups of kernels identified in the plurality of workgroup designations and the plurality of kernel designations to process input data.

29 Claims, 8 Drawing Sheets

(56) References Cited

OTHER PUBLICATIONS

Nvidia Cuda C Programming Guide Version 3.2, Sep. 8, 2010, Retrieved from the Internet: http://coitweb.uncc.edu/˜abw/ITCS6010S11/CUDA_C_Programming_Guide.pdf, 179 pp. (Uploaded in two parts.)

Prabhat et al., "High Performance Data Mining Using R on Heterogeneous Platforms," 2011 IEEE International Symposium on Parallel and Distributed Processing Workshops and PHD Forum (IPDPSW), May 16, 2011, pp. 1720-1729.

International Preliminary Report on Patentability from international application No. PCT/US2012/038659, dated Aug. 16, 2013, 17 pp.

Response to Written Opinion mailed Aug. 10, 2012, from international application No. PCT/US2012/038659, filed Feb. 21, 2013, 10 pp.

Second Written Opinion of international application No. PCT/US2012/038659, mailed Jun. 3, 2013, 7 pp.

Reply to Second Written Opinion mailed Jun. 3, 2013, from international application No. PCT/US2012/038659, filed Jul. 31, 2013, 16 pp.

Substantive Examination Report from corresponding European Patent Application No. 12725205.4 dated Sep. 19, 2014 (7 pages).

Nishitsuji, et al., "Fast Calculation of Fresnel Diffraction using AMD GPU and OpenCL", Proceedings of the 2011 IEICE General Conference, Information and Systems 2, Feb. 28, 2011, 4 pp. [partial translation].

Office Action from counterpart Japanese Application No. 2014-516973, dated Dec. 16, 2014, 7 pp.

Response from counterpart European Application No. 12725205.4, dated Jan. 23, 2015, 10 pp.

Notice of Grounds for Rejection from corresponding Korean Application Serial No. 2014-7001412 dated Apr. 30, 2015 (12 pages) translation included.

* cited by examiner

MEMORY SHARING IN GRAPHICS PROCESSING UNIT

TECHNICAL FIELD

This disclosure relates to processing data using a graphics processing unit (GPU).

BACKGROUND

Graphics processing devices may be implemented to carry out a variety of image processing or other general purpose processing applications. For example, a graphics processing unit (GPU, sometimes referred to as a general purpose graphics processing unit (GPGPU), may execute applications that benefit from a high degree of parallelism, such as color correction algorithms, face detection algorithms, pattern recognition algorithms, augmented reality applications, a variety of algorithm applications (e.g., wavelet transforms, Fourier transforms, and the like), or a variety of other applications.

In general, GPUs are designed to process a series of instructions, which may be referred to as shader instructions, using one or more shader processors residing in the GPU. In an example image processing application, shader instructions may define one or more mathematical operations to be performed by the shader processors on the pixels that make up the image. By applying a shader instruction to a pixel, the pixel value is changed or evaluated according to the mathematical operation defined by the shader instruction.

Shader instructions may be organized into shader program code known as a kernel. A kernel may define a function or task that is performed by the GPU. In order to execute a kernel, the program code is divided into work items (e.g., a basic unit of work in a GPU), which are organized into one or more workgroups (e.g., a set of work items).

SUMMARY

In general, aspects of this disclosure are related to generation and processing of kernel and workgroup execution orders for graphics processing. Kernel and workgroup execution orders may provide management of memory resources associated with a shader processor (SP) of a graphics processing unit (GPU). For example, kernel and workgroup execution orders allow data stored in local memory resources of an SP to be shared by workgroups of different kernels. In one example, aspects of this disclosure are directed to a method of processing data with a graphics processing unit (GPU). The method includes receiving input defining execution orders for a shader processor, wherein the execution orders comprise a plurality of kernel designations and a plurality of workgroup designations. The method also includes assigning workgroups of kernels identified in the plurality of workgroup designations and the plurality of kernel designations to the shader processor. The method also includes executing, by the shader processor, the workgroups of kernels identified in the plurality of workgroup designations and the plurality of kernel designations to process input data.

In another example, aspects of this disclosure are directed to a graphics processing unit (GPU) comprising a sequencer module. The sequencer module is configured to receive input defining execution orders for a shader processor, wherein the execution orders comprise a plurality of kernel designations and a plurality of workgroup designations. The sequencer module is also configured to assign workgroups of kernels identified in the plurality of workgroup designations and the plurality of kernel designations to the shader processor. The shader processor is configured to execute the workgroups of kernels identified in the plurality of workgroup designations and the plurality of kernel designations to process input data.

In another example, aspects of this disclosure are directed to a computer-readable storage medium encoded with instructions for causing one or more programmable processors of a computing device to receive input defining execution orders for a shader processor, wherein the execution orders comprise a plurality of kernel designations and a plurality of workgroup designations. The instructions also cause one or more programmable processors of a computing device to assign workgroups of kernels identified in the plurality of workgroup designations and the plurality of kernel designations to the shader processor. The instructions also cause one or more programmable processors of a computing device to execute, by the shader processor, the workgroups of kernels identified in the plurality of workgroup designations and the plurality of kernel designations to process input data.

In another example, aspects of this disclosure are directed to a graphics processing unit (GPU) comprising a means for receiving input defining execution orders for a shader processor, wherein the execution orders comprise a plurality of kernel designations and a plurality of workgroup designations. The GPU also comprises a means for assigning workgroups of kernels identified in the plurality of workgroup designations and the plurality of kernel designations to the shader processor. The GPU also comprises a means for executing, by the shader processor, the workgroups of kernels identified in the plurality of workgroup designations and the plurality of kernel designations to process input data.

The details of one or more examples are set forth in the accompanying drawings and the description below. Other features, objects, and advantages will be apparent from the description and drawings, and from the claims.

DETAILED DESCRIPTION

Figure 1:
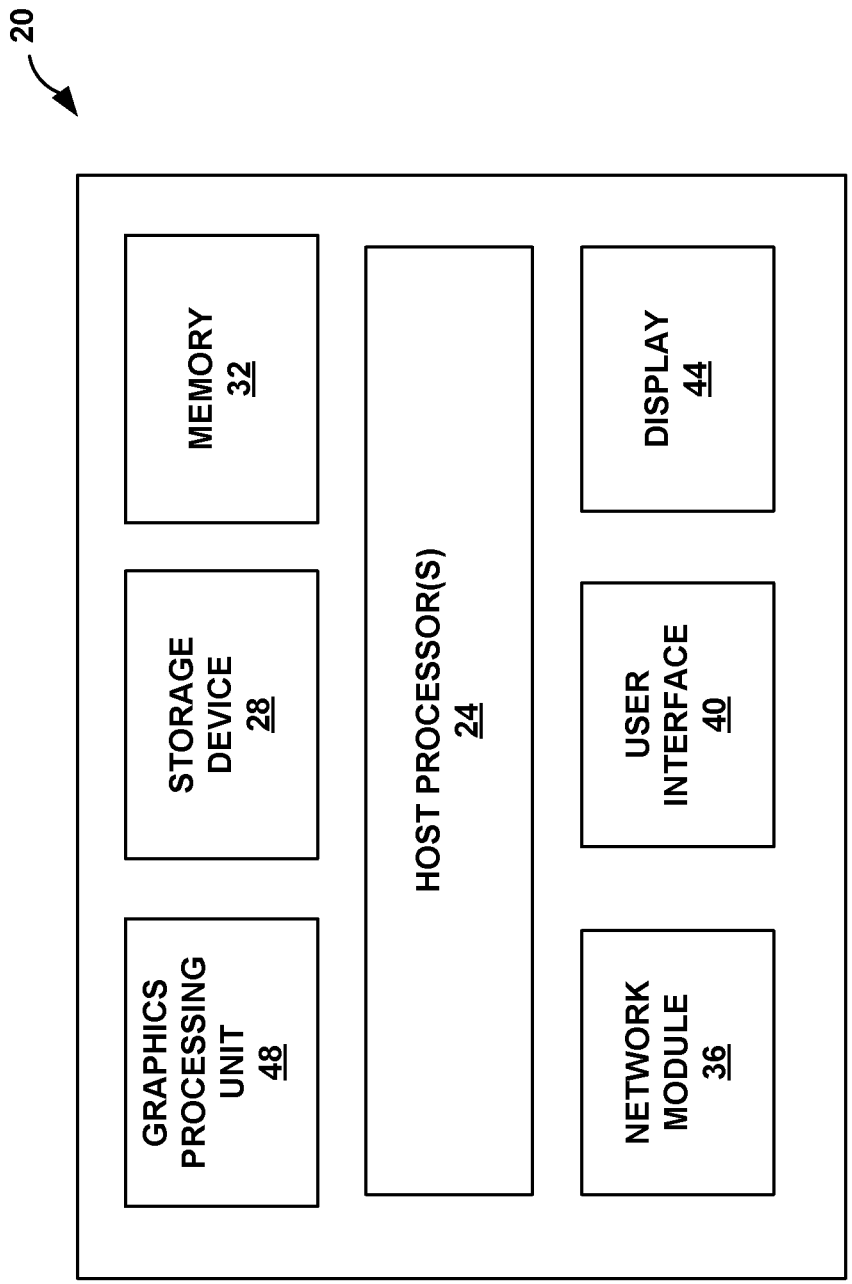
FIG. 1 is a block diagram illustrating a computing device having a graphics processing unit (GPU) that may be configured to implement aspects of this disclosure.

Aspects of this disclosure generally relate to defining and generating streams of shader instructions for execution by a shader processor (SP) of a GPU, which may be implemented as a GPGPU. Typically, GPUs include a plurality of SPs that are designed to execute one or more shader programs (referred to herein as "kernels"). Kernels define functions that can be implemented to analyze or modify a variety of input data. Examples include functions for processing relatively large numerical data sets in parallel. In an image processing context, functions may include, for example, color correction algorithms, face detection algorithms, or functions for carrying out augmented reality applications. Other examples include transform functions, functions for ray tracing, or a variety of other functions.

Kernels comprise individual work items (e.g., a basic unit of work in a GPU) that are grouped into workgroups. In an example in which a GPU is implemented to process an image (e.g., a frame of video data, computer-generated graphics image, still image, and the like), the input data is the image and the work items are configured to analyze or modify pixels of the image. A plurality of work items can be organized into workgroups (e.g., a set of work items). Accordingly, in the image processing example, workgroups may include instructions related to a particular group of pixels in an image.

When executing the kernels, a GPU loads the input data associated with a workgroup into local memory of an SP before the SP can execute the workgroup. Generally, when a GPU executes a kernel, the GPU assigns workgroups of the kernel to SPs without identifying or controlling which SP executes a particular workgroup. For example, a GPU may include hardware that distributes workgroups to SPs in a fixed pattern that is not configurable by a GPU application developer (e.g., computer programmer). In such an example, the GPU sequentially executes an application having multiple kernels by evenly distributing and executing all workgroups associated with a particular kernel prior to moving on to the next kernel.

Workgroup data typically cannot be shared between SPs. For example, SPs are typically discrete and physically separate units within a GPU, and a GPU application developer does not control which SP executes a particular workgroup. Accordingly, in an application having multiple kernels that process the same or substantially the same input data, the input data associated with a particular workgroup may need to be loaded into local memory of different SPs. For example, without the ability to control which SP of the GPU executes a particular workgroup of a particular kernel, a workgroup of a first kernel having the same input data as a workgroup of a second kernel may be processed by different SPs of the GPU.

Aspects of the disclosure relate to generating and processing kernel and workgroup execution orders. Kernel and workgroup execution orders support management of local memory resources associated with an SP of a GPU. For example, kernel and workgroup execution orders executed by a GPU allow data stored in SP local memory to be shared by workgroups of different kernels. Kernel and workgroup execution orders may be referred to as "instruction streams." An instruction stream ties, or virtually links, workgroups and kernels together such that the input data associated with one workgroup of one kernel can be shared and serially executed by multiple other kernels using a single SP. By generating the instruction streams, input data is able to remain in local SP memory and can be available to workgroups of multiple kernels. Creating instruction streams reduces memory bandwidth consumption as well as SP arithmetic logic unit (ALU) operations, because ALU operations are not necessary for fetching the same data multiple times.

In some examples, kernel and workgroup execution orders are useful when a GPU is executing an application having multiple kernels that process the same, or substantially the same, input data. In one example implementation, a GPU may be implemented to process an image (e.g., a frame of video data, computer-generated graphics image, still image, and the like). In this example, a work item may correspond to an instruction related to a particular pixel of an image. A plurality of work items can be organized into workgroups that include instructions related to a particular group of pixels of the image. When processing a workgroup associated with a group of pixels, the GPU loads the image data associated with the group of pixels into local memory of an SP.

Without the ability to control which SP of the GPU executes a particular workgroup, in the image processing example, executing multiple kernels in succession may cause the same input image area to be processed by different SPs. For example, to execute a first kernel, the GPU loads the data associated with the entire image, one workgroup at a time, into local memory of the SPs of the GPU for execution. To execute a second kernel after executing the first kernel, the GPU reloads the same image data into local memory of the SPs of the GPU for execution. Accordingly, the input image data is loaded into local SP memory multiple times, once for each kernel. The SP local memory input bandwidth consumption for an entire image is approximately equal to the image data size multiplied by the number of kernels (e.g., a program for analyzing a 64 MB image having 3 kernels results in 3×64 MB or 192 MB of bandwidth consumed). Without any input data sharing between kernels and their executed workgroups, a relatively large amount of memory bandwidth is consumed.

In the image processing example, generating and executing instruction streams allows data associated with a particular portion of an image to be loaded into local memory resources of a particular SP once and processed with multiple kernels. An example program having three kernels (e.g., a first kernel, a second kernel, and a third kernel) is provided. Data associated with a first workgroup of a first kernel is loaded into a particular SP's local memory and the first workgroup is executed by the SP. In addition, an instruction stream is provided that includes kernel and workgroup execution orders, which direct the same SP to subsequently execute the first workgroup of a second kernel, followed by the first workgroup of the third kernel. Accordingly, image data associated with the first workgroup need not be loaded into the particular SP's local memory prior to executing the second kernel and the third kernel. Instead, the second kernel and the third kernel use the input data previously loaded for the first kernel. In this way, memory bandwidth consumption may be reduced, because the data associated with a particular area of an input image need only be loaded into local SP memory once and can be processed with multiple kernels. In the three-kernel example provided above, the memory bandwidth consumption is reduced by two thirds.

Instruction streams can be defined in a variety of ways. According to some aspects, a user identifies candidate kernels that would benefit from utilizing instruction streams. For example, a user may identify kernels that utilize the same input data multiple times. Utilizing instruction streams may help to manage local memory resources of SPs by reducing the number of times input data needs to be loaded into the local memory resources.

After identifying candidates, the user can define instruction streams in a program that is executed by a GPU. For example, GPU application programming is typically performed by an application developer (e.g., a computer programmer) with an application program interface (API) that provides a standard software interface that can run on multiple platforms, operating systems, and hardware. Examples of APIs include Open Graphics Library ("OpenGL," version 4.1 released Jul. 26, 2010 and publically available), Compute Unified Device Architecture ("CUDA" developed by NVIDIA Corporation, version 3.2 released Sep. 17, 2010), and DirectX (developed by Microsoft, Inc., version 11 released Oct. 27, 2009). In general, an API includes a predetermined, standardized set of commands that are executed by associated hardware. API commands allow a user to instruct hardware components of a GPU to execute commands without user knowledge as to the specifics of the hardware components.

Aspects of the disclosure relate to one or more API commands that allow a user to define instruction streams. For example, one or more API commands may be developed and created in design environment. The API commands may then be included in an API, such as the APIs described above, as a preconfigured option for users (e.g., computer programmers) of the API.

A user can implement the preconfigured instruction stream API commands to designate instruction streams in an application that will be executed by a GPU during development and coding of an application. For example, the instruction stream API commands allow the user to designate instructions (e.g., one or more workgroups) from different kernels of a multiple-kernel application to be processed sequentially by a particular SP. Upon executing an application that includes instruction stream designations, a GPU routes instructions (e.g., workgroups of different kernels) to an SP of the GPU in accordance with the received designations.

In another example, an automated system may be implemented to generate instruction streams. For example, a program, such as a compiler program, may automatically generate instruction streams for an application that repetitively processes the same input data with multiple kernels. In this example, the program may partition instructions of each kernel so that each group of instructions corresponds to a predetermined amount of input data (e.g., a workgroup of instructions). The program may then generate instruction streams by linking the groups of instructions from different kernels such that the input data associated with one group of instructions of one kernel can be shared and serially executed by multiple other kernels using a single SP.

In a non-limiting image processing example, a GPU application developer may provide the instruction stream generating program with an input image and an application having three kernels for processing the image. The instruction stream generating program can automatically generate instruction streams based on predefined spatial areas of the image. For example, the instruction stream generating program may partition instructions of each of the three kernels into groups of instructions, with each group of instructions corresponding to a predefined area of the input image. The instruction stream generating program can then generate instruction streams by linking the groups of instructions of each of the kernels that are associated with the same input image area.

For example, a program, such as a compiler program or other development/analysis program, may identify candidate kernels that would benefit from implementing instruction streams. For example, a program may monitor memory access patterns and identify data that is used by more than one kernel. In this example, the program may monitor and log the read/write access patterns associated with workgroups of an application having multiple kernels. After logging, the program can detect input/output dependency of respective workgroups of each kernel. That is, the program can determine which workgroups of the multiple kernel application utilize the same input data. Based on this data sharing information, instruction stream designations can be inserted into the application that facilitate workgroups from different kernels of a multiple-kernel application being processed sequentially by a particular SP. For example, code can be inserted into the application that instructs a GPU to execute workgroups from different kernels that share the same input data to be executed sequentially by the same SP.

The program for identifying candidate kernels and designating workgroups of different kernels to an instruction stream may be executed during application development, or "on the fly" during GPU application execution. For example, according to some aspects, a GPU application developer may implement the program for identifying candidate kernels and designating workgroups of different kernels to an instruction stream. The developed GPU application may then include the instruction stream designations that will be executed by a GPU. In another example, a host processor or GPU of a computing device may implement the program for identifying candidate kernels and designating workgroups of different kernels to an instruction stream "on the fly" while executing a GPU application.

FIG. 1 is a block diagram illustrating a computing device 20 that may be configured to implement aspects of this disclosure. As shown in FIG. 1, computing device 20 includes a host processor 24, a storage device 28, a memory 32, a network module 36, a user interface 40, and a display 44. Computing device 20 also includes a graphics processing unit (GPU) 48.

Computing device 20 may, in some examples, include or be a part of a portable computing device (e.g. mobile phone, netbook, laptop, tablet device, digital media player, gaming device, or other portable computing device). Alternatively, computing device 20 may be configured as a desktop computer or other stationary computing device. Computing device 20 may include additional components not shown in FIG. 1 for purposes of clarity. For example, computing device 20 may include one or more communication bridges for transferring data between components of the computing device 20. Moreover, the components of computing device 20 shown in FIG. 1 may not be necessary in every example of computing device 20. For example, user interface 40 and display 44 may be external to computing device 20, e.g., in examples where computing device 20 is a desktop computer.

Host processor 24 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to host processor 24, in this disclosure, may be embodied as software, firmware, hardware or any combination thereof.

Host processor 24 processes instructions for execution within computing device 20. Host processor 24 may be capable of processing instructions stored on storage device 28 or instructions stored in memory 32. Example applications include applications for processing viewable images (e.g., filtering images, analyzing images for predefined features, and the like). Host processor 24 may execute the one or more applications based on a selection by a user via user interface 40. In some examples, host processor 24 may execute the one or more applications without user interaction.

According to some aspects of the disclosure, and as described in greater detail below with respect to GPU 48, host processor 24 may collaborate with GPU 48 to execute various tasks associated with one or more applications. For example, host processor 24 may initialize execution of an application and offload or delegate certain processing functions associated with the application to GPU 48. In an example, host processor 24 may initialize execution of an image processing application, and offload certain processing functions associated with the application to GPU 48.

Storage device 28 may include one or more computer-readable storage media. Storage device 28 may be configured for long-term storage of information. In some examples, storage device 28 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. Storage device 28 may, in some examples, be considered a non-transitory storage medium. The term "non-transitory" may indicate that the storage medium is not embodied in a carrier wave or a propagated signal. However, the term "non-transitory" should not be interpreted to mean that storage device 28 is non-movable. As one example, storage device 28 may be removed from computing device 20, and moved to another device. As another example, a storage device, substantially similar to storage device 28, may be inserted into computing device 20.

Storage device 28 may store instructions for execution of one or more applications by host processor 24 or GPU 48. Storage device 28 may also store data for use by host processor 24 or GPU 48. For example, storage device 28 may store image data for processing by host processor 24 or GPU 48.

Memory 32 may be configured to store information within computing device 20 during operation. In some examples, memory 32 is a temporary memory, meaning that a primary purpose of memory 32 is not long-term storage. Memory 32 may, in some examples, be described as a computer-readable storage medium. Accordingly, memory 32 may also be considered "non-transitory," despite storing data that can change over time. Memory 32 may also, in some examples, be described as a volatile memory, meaning that memory 32 does not maintain stored contents when the computer is turned off. Examples of volatile memories include random access memories (RAM), dynamic random access memories (DRAM), static random access memories (SRAM), and other forms of volatile memories known in the art.

In some examples, memory 32 may be used to store program instructions for execution by host processor 24 or GPU 48. Memory 32 may be used by software or applications running on computing device 20 to temporarily store information during program execution. As such, memory 32 may be accessed by other components of computing device 20 such as host processor 24 and GPU 48.

Computing device 20 may utilize network module 36 to communicate with external devices via one or more networks, such as one or more wireless networks. Network module 36 may be a network interface card, such as an Ethernet card, an optical transceiver, a radio frequency transceiver, or any other type of device that can send and receive information. In some examples, computing device 20 may utilize network module 36 to wirelessly communicate with an external device such as a server, mobile phone, or other networked computing device.

Computing device 20 also includes user interface 40. Examples of user interface 40 include, but are not limited to, a trackball, a mouse, a keyboard, and other types of input devices. User interface 40 may also include a touch-sensitive screen that is incorporated as a part of display 44. Display 44 may comprise a liquid crystal display (LCD), an organic light emitting diode (OLED) display, a plasma display, or another type of display device.

GPU 48 of computing device 20 may be a dedicated hardware unit having fixed function and programmable components for executing GPU applications. GPU 48 may also include a DSP, a general purpose microprocessor, an ASIC, an FPGA, or other equivalent integrated or discrete logic circuitry. GPU 48 may also include other components, such as dedicated memory, as described in greater detail with respect to FIG. 4. Furthermore, although shown as separate components in FIG. 1, in some examples, GPU 48 may be formed as part of host processor 24. GPU 48 may be configured to utilize processing techniques in accordance with a variety of application programming interfaces (APIs). For example, a user may program an application to be executed by GPU 48 using a standard software interface that can run on multiple platforms, operating systems, and hardware. In some examples, GPU 48 may be configured to utilize applications generated using OpenCL, CUDA, or the DirectX collection of APIs (as described above).

According to some examples, GPU 48 can be implemented as a general purpose graphics processing unit (GPGPU). For example, GPU 48 may carry out a variety of general purpose computing functions traditionally carried out by host processor 24. Examples include a variety of image processing functions, including video decoding and post processing (e.g., de-blocking, noise reduction, color correction, and the like) and other application specific image processing functions (e.g., facial detection/recognition, pattern recognition, wavelet transforms, and the like). In some examples, GPU 48 may collaborate with host processor 24 to execute applications. For example, host processor 24 may offload certain functions to GPU 48 by providing GPU 48 with instructions for execution by GPU 48.

When implemented as a GPGPU, GPU 48 executes shader programs, referred to herein as kernels. Kernels can be defined by a user using an API, such as the example APIs described above. Kernels may comprise individual work items (e.g., a basic unit of work in a GPU) that are grouped into workgroups.

According to some aspects of the disclosure, GPU 48 receives and executes kernel and workgroup execution orders, referred to herein as instruction streams. GPU 48 can use kernel and workgroup execution orders to manage local memory resources associated with an SP (e.g., as shown and described, for example, with respect to FIG. 4) of GPU 48. For example, GPU 48 may use the kernel and workgroup execution orders to share data stored in SP local memory with workgroups of different kernels.

Certain examples provided in the following figures may refer to a GPU executing work items and workgroups to perform an image processing application. For example, the work items and workgroups may be described below as being associated with pixels of an image (e.g., a frame of video data). It should be understood, however, that a GPU may be implemented to carry out a variety of functions other than image processing functions on a variety of input data (e.g., any functions and data sets that benefit from parallel processing). Accordingly, the examples and aspects described below regarding instruction streams and memory sharing between workgroups, for example, can be carried out by a GPU performing a variety of other functions on a variety of other input data sets.

Figure 2:
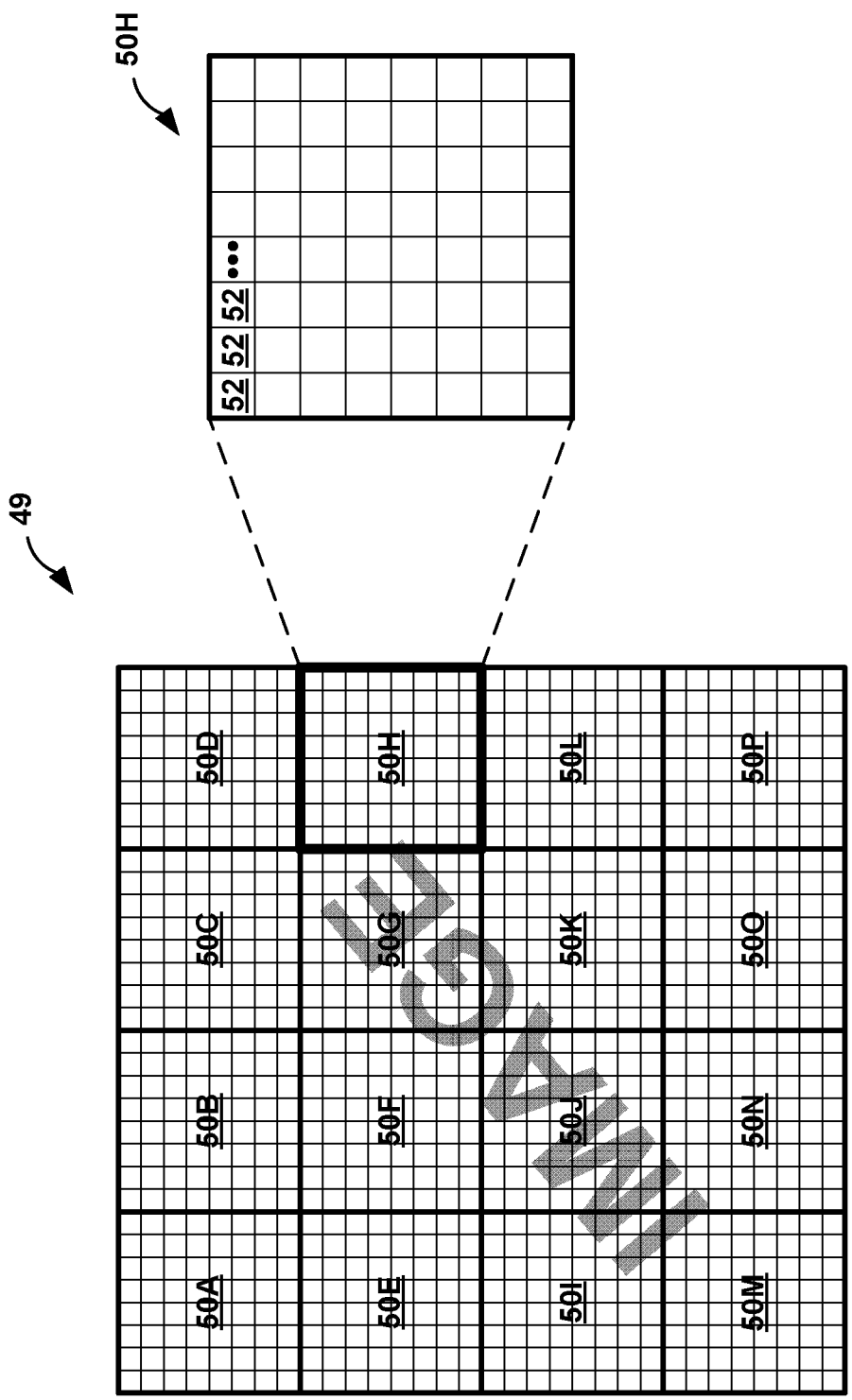
FIG. 2 is a block diagram illustrating an example image having image data with associated instructions for processing the image, which may be executed by a GPU, according to aspects of the disclosure.

FIG. 2 is a block diagram illustrating an example image 49 having image data with associated instructions for processing image 49. The instructions are represented as being divided into a plurality of workgroups 50A-50P (collectively workgroups 50), with each workgroup including a plurality of work items 52. The instructions may be executed by a GPU, such as the GPU 48 shown in FIG. 1. In the example shown in FIG. 2, instructions for processing image 49 are divided into 16 workgroups 50, and each workgroup 50 is divided into 64 separate work items 52, although other divisions are possible.

In the example shown in FIG. 2, image 49 is a square, approximately 16 megabyte (MB) image that includes 1024 pixels. Each of the work items 52 represents a basic unit of work that can be executed by GPU 48. In some examples, each work item 52 includes instructions that may be related to a particular pixel of image 49. Accordingly, when GPU 48 executes a work item 52, the corresponding pixel of image 49 may be processed (e.g., analyzed or changed according to the instructions). The work items 52 may be organized into workgroups 50 that include instructions related to a particular group of pixels of image 49. When processing a workgroup 50, image data related to the particular group of pixels associated with the workgroup 50 may be loaded into local memory resources of an SP (as shown and described, for example, with respect to FIG. 4 below).

The relationships between pixel data, work items, and workgroups described with respect to FIG. 2 are merely one example of possible instruction structures. In other examples, a work item may relate to more or less than one pixel of image 49.

Figure 3:
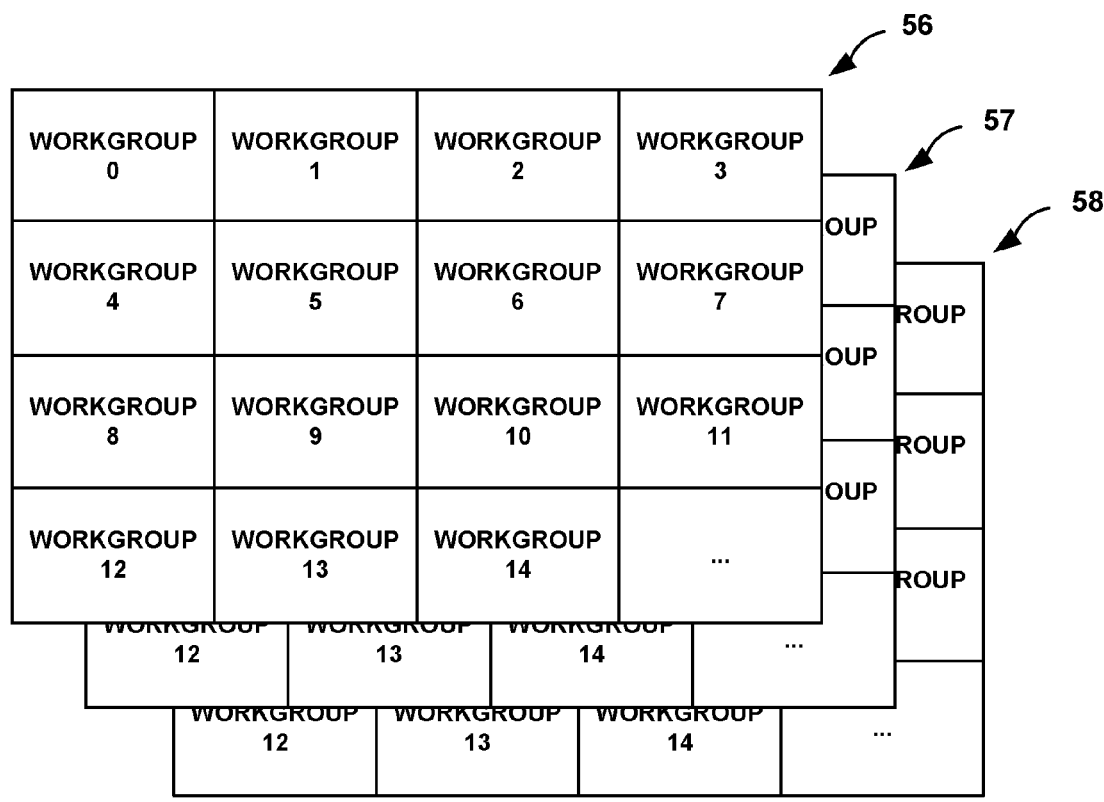
FIG. 3 is a block diagram illustrating an application having three kernels that can be executed by a GPU, according to aspects of the disclosure.

FIG. 3 is a block diagram illustrating workgroups in an arrangement of three kernels (e.g., a first kernel 56, a second kernel 57, and a third kernel 58) that can be executed by a GPU, such as GPU 48 shown in FIG. 1. Again, each kernel may be executed to perform a specific function related to a given application. In some examples, the kernels 56-58 may define functions for color correction algorithms, face detection algorithms, pattern recognition algorithms, augmented reality applications, a variety of algorithm applications (e.g., wavelet transforms, Fourier transforms, and the like), or a variety of other applications. For purposes of illustration only, FIG. 3 is described with respect to the example GPU 48 shown in FIG. 1 and the example image 49 shown in FIG. 2.

GPU 48 may execute kernels 56-58 to carry out to carry out a specific task on an image, such as image 49 shown in FIG. 2. For example, GPU 48 may be implemented as a GPGPU to carry out a variety of functions such as face detection/recognition, pattern recognition, and many other functions suited for parallel processing (e.g., processing more than one instruction concurrently). Provided as a simplified, non-limiting example, kernels 56-58 may be implemented in a face detection application. In this example, GPU 48 can implement kernels 56-58 to detect one or more faces in image 49. Each of the kernels 56-58 may be configured to perform a specific face detection related function. Such kernels 56-58 may be referred to as "classifiers." That is, the kernels 56-58 classify pixels as having (or not having) a specific, predefined feature. The kernels 56-58 may include mathematical formulas that have been created using a number of training images. For example, the kernels 56-58 may include mathematical formulas that have been developed in a testing environment with a number of predefined images.

In the example shown in FIG. 3, GPU 48 may execute the kernels 56-58 consecutively to determine whether each pixel includes the predefined properties set forth in the kernels 56-58. That is, when executed by GPU 48, each kernel 56-58 may return a Boolean value which can be used to identify a predefined property that is associated with a face. If a certain pixel exhibits all of the predefined properties set forth in kernels 56-58 (e.g., the Boolean results associated with the pixels satisfy some predefined criteria), the pixel is considered a candidate face pixel. If a certain pixel does not exhibit the predefined properties set forth in kernels 56-58 (e.g., the Boolean results associated with the pixel do not satisfy some predefined criteria), the pixel is excluded from being considered a face pixel.

In the image processing example of FIG. 3, the data associated with the image 49 is processed three times, one for each kernel 56-58. For example, workgroups of kernels 56-58 may correspond to the same input image area of image 49. Similarly numbered workgroups of each of the kernels 56-58 may include a set of instructions that are to be carried out on the same input image area of image 49.

Aspects of the disclosure relate to generation of instructions that tie similarly numbered workgroups of kernels 56-58 into instruction streams for processing by GPU 48. For example, a user (e.g., computer or application programmer) or program can create an instruction stream that instructs GPU 48 to execute Workgroup 0 of kernel 56, followed by Workgroup 0 of kernel 57, and followed by Workgroup 0 of kernel 58 using the same SP. In this way, GPU 48 can load the input area of image 49 that corresponds to Workgroup 0 into local memory resources of a shader processor (SP) of GPU 48 (e.g., as shown and described, for example, with respect to FIG. 4) and process that input image area sequentially using kernels 56-58.

In some examples, a user (e.g., computer or application programmer) can define the instruction streams that include workgroup designations of kernels 56-58 using a preconfigured API command while developing the kernels 56-58. For example, a user can implement the preconfigured instruction stream API commands to designate workgroups of kernels 56-58 to instruction streams that will be executed by GPU 48. Upon executing the instruction stream designations associated with kernels 56-58, a GPU 48 routes the workgroups of kernels 56-58 to a certain SP of GPU 48.

In another example, an automated system may be implemented to generate instruction streams that include workgroup designations of kernels 56-58. For example, a complier program or other program (e.g., a program that traces memory access patterns from complied low level machine assembler code) may monitor or analyze memory access patterns and identify that data associated with a workgroup, such as Workgroup 0, is accessed multiple times by kernels 56-58. The program may then designate the workgroups to an instruction stream so that the workgroups are processed sequentially by an SP of GPU 48. Upon executing the instruction stream designations associated with kernels 56-58, a GPU 48 routes the workgroups of kernels 56-58 to a certain SP of GPU 48.

Figure 4:
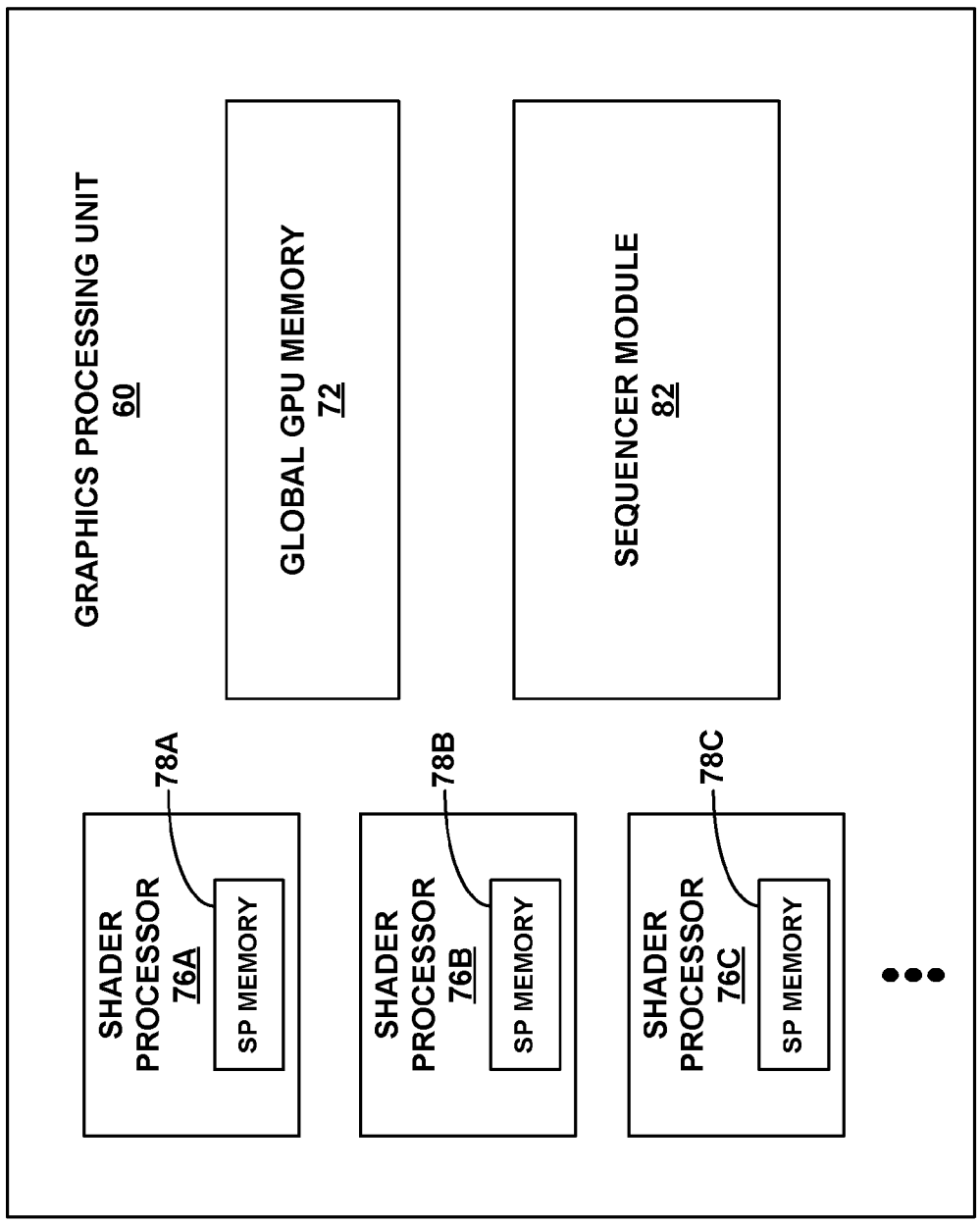
FIG. 4 is a block diagram illustrating a GPU that may be configured to carry out aspects of the disclosure.

FIG. 4 is a block diagram illustrating a GPU 60 that may be configured to carry out aspects of the disclosure. In some examples, GPU 60 may be configured similarly to, or the same as, GPU 48 shown in FIG. 1. In the example shown in FIG. 4, GPU 60 includes a memory 72, shader processors 76A-76C (collectively, SPs 76) having shader processor memories 78A-78C, respectively, (collectively, SP memories 78), and a sequencer module 82.

In other examples, GPU 60 may include other components not shown in FIG. 4 for purposes of clarity. For example, GPU 60 may also include a variety of other modules related to analyzing and rendering images, such as a rasterizer, texture units, one or more buffers, or other GPU components. In addition, GPU 60 may include more or fewer components than those shown in FIG. 4. For example, GPU 60 is shown in FIG. 4 as including three SPs 76. In other examples, however, GPU 60 may include more or fewer SPs than those shown in FIG. 4.

In some examples, GPU memory 72 may be similar to memory 32 shown in FIG. 1. For example, GPU memory 72 may be a temporary computer-readable storage medium. Examples of GPU memory 72 include random access memories (RAM), dynamic random access memories (DRAM), static random access memories (SRAM), and other forms of memories known in the art. In examples where GPU 60 is formed as part of another processor, such as host processor 24 shown in FIG. 1, GPU memory 72 may be accessed by components other than GPU 60.

GPU memory 72 may be configured as a global memory for GPU 60. For example, GPU memory 72 may be configured to store instructions and information within GPU 60 during operation (e.g., image data and instructions for processing by GPU 60). GPU memory 72 may also be configured to store results of data that has been processed by GPU 60. In some examples, GPU memory 72 interfaces with computing device components that are external to GPU 60. For example, a component of a computing device that incorporates GPU 60 may initially pass data to GPU memory 78 (e.g., one or more frames of video data) for processing by GPU 60. GPU 60 then processes the data and stores the results to GPU memory 72. The results may subsequently be read from GPU memory 72 to another component of the computing device.

SPs 76 may be configured as a programmable pipeline of processing components. In some examples, SPs 76 may be referred to as "unified shaders," in that the SPs 76 can perform geometry, vertex, or pixel shading operations to render graphics. SPs 76 can also be used in GPGPU applications for performing general purpose calculations. For example, SPs 76 may be implemented to analyze or otherwise process an image, such as image 49 shown in FIG. 2. SPs 76 may include a one or more components not specifically shown in FIG. 4, such as components for fetching and decoding instructions and one or more arithmetic logic units ("ALUs") for carrying out arithmetic calculations. SPs 76 also include one or more memories, caches, or registers, such as SP memories 78.

SP memories 78 may be configured as registers or data caches for storing data that is processed by SPs 76. In some examples, SP memories 78 are local memories of the SPs 76. For example, SP memories 78 may be relatively smaller than global GPU memory 72, and store the data associated with one or more workgroups prior to execution. The SP memories 78 may have relatively lower latency than GPU memory 72. For example, SP memories 78 can be accessed by SPs 76 relatively quickly. Latency associated with data transfer from global memory 72 to SP memories 78, however, is typically much greater. For example, data transfer from global memory 72 to SP memories 78 may consume multiple clock cycles, thereby creating a bottleneck and slowing overall performance of GPU 60.

SP memories 78 may exchange data with GPU memory 72 when GPU 60 is operating. For example, GPU 60 sends data associated with one or more workgroups from GPU memory 72 to SP memories 78. Once stored in SP memories 78, SPs 76 operate in parallel to access and process the data stored in the separate SP memories 78. Upon executing the data, SPs 76 return the results to GPU memory 72. In general, memory bandwidth between SP memories 78 and SPs 76 is greater than the memory bandwidth between GPU memory 72 and SPs 76. Accordingly, an SP 76 can generally read data from an associated SP memory 78 more quickly than the SP 76 can read data from GPU memory 72. That is, GPU memory 72 typically exhibits higher latency than that associated with SP memories 78. Accordingly, it may be beneficial for data to be transferred to SP memories 78 prior to being executed by SPs 76.

Sequencer module 82 controls instruction and data flow within GPU 60. Sequencer module 82 may comprise a combination of fixed function and programmable components for distributing work items, workgroups and associated data to SP memories 78 for execution by the SPs 76. Accordingly, sequencer module 82 manages data transfers between GPU memory 72 and SPs 76. For purposes of example only, workgroup distribution of sequencer module 82 is described with respect to the application shown and described with respect to FIG. 3.

Sequencer module 82 may distribute workgroups in a fixed distribution pattern without regard to which workgroups are executed by a particular SP of SPs 76. For example, to process the example application 54 (shown in FIG. 3) having multiple kernels 56-68, sequencer module 82 may distribute workgroups evenly to all SPs 76 of GPU 60. In addition, as described in greater detail with respect to FIG. 5 below, sequencer module 82 may distribute all workgroups of a kernel to the SPs 76 before moving on to the next kernel. For example, sequencer module 82 may distribute Workgroup 0 of kernel 56 to SP 76A, Workgroup 1 of kernel 56 to SP 76B, Workgroup 2 of kernel 56 to SP 76C and so on until kernel 56 has been processed by the SPs 76.

In other examples, according to some aspects of the disclosure, sequencer module 82 may receive and execute kernel and workgroup execution orders. For example, sequencer module 82 may receive the instructions defining instruction streams that direct sequencer module 82 to distribute workgroups of kernels to a specific SP of SPs 76. The instruction streams tie workgroups of different kernels together so that they are processed by the same SP of SPs 76. The instruction streams provide a way to manage resources of SP memories 78. For example, by carrying out the instructions that define the instruction streams, sequencer module 82 allows the input data associated with one workgroup to be shared and serially executed by workgroups of multiple other kernels.

Sequencer module 82 can be implemented to carry out instructions that define instruction streams when GPU 60 is executing an application having multiple kernels that process the same, or substantially the same, input data. For example, as described with respect to FIG. 3, application 54 includes three kernels 56-58, each kernel having a plurality of associated workgroups. Workgroup 0 of kernel 56 corresponds to the same input data as Workgroup 0 of kernel 57 and Workgroup 0 of kernel 58. Accordingly, sequencer module 82 may sequentially distribute Workgroup 0 of kernels 56-58 to SP 76A. In addition, sequencer module 82 may distribute Workgroup 1 of kernels 56-58 to SP 76B, and so on until all workgroups of all kernels have been executed by SPs 76.

In this way, sequencer module 82 can manage local memory resources of SP memories 78. For example, prior to executing Workgroup 0 of kernel 56, GPU 60 transfers the input data associated with Workgroup 0 of kernel 56 from GPU memory 72 to SP memory 78A. After executing Workgroup 0 of kernel 56, and instead of fetching new data for SP memory 78A, sequencer module 82 directs SP 76A to execute Workgroup 0 of kernel 57, followed by Workgroup 0 of kernel 58. The input data of Workgroup 0 is the same among kernels 56-58, so the data associated with Workgroup 0 can remain in SP memory 78A and be shared by Workgroup 0 of all three kernels 56-58.

Executing instruction streams and sharing data between workgroups of different kernels may provide a local memory bandwidth savings, as compared to a system that distributes workgroups in a fixed distribution pattern. For example, sharing data between workgroups of different kernels allows for less data to be transferred between GPU memory 72 and SP memories 78. In the three kernel example shown in FIG. 3, memory bandwidth consumption between GPU memory 72 and SP memories 78 is reduced by two thirds. Rather than transferring the data associated with a workgroup, such as Workgroup 0, to local SP memory three times (e.g., one transfer for each kernel), GPU 60 can transfer the data associated with the workgroup to local SP memory once and share the data between all three kernels 56-58.

According to some examples of the disclosure, the local memory bandwidth savings associated with executing instruction streams may also provide a time savings. For example, while the SPs may perform the same number calculations associated with the workgroups to execute a given program, such as program 54, time savings may be achieved because less data may be transferred between GPU memory 72 and SP memories 78. As described above, data transfer between GPU memory 72 and SP memories 78 may be a relatively time intensive process that introduces a bottleneck into the process of executing the program 54. Accordingly, reducing the amount of data that is required to be transferred between GPU memory 72 and SP memories 78 also may reduce the bottleneck associated with data transfer between GPU memory 72 and SP memories 78.

The instructions received by sequencer module 82 defining instruction streams may be generated by a user or may be automatically generated (e.g., by a compiler program). For example, a user (e.g., a software developer) may define and implement instruction streams using an API that includes one or more instruction stream commands. Upon receiving the application having the instruction stream commands, sequencer module 82 executes the instruction stream commands to manage local memory resources associated with the SPs 76.

The instructions defining instructions streams may be transmitted to sequencer module 82 by a host processor of a computing device, such as host processor 24 shown in FIG. 1. In examples in which GPU 60 is a distinct device (e.g., not included in a computing device having a host processor), another processing component may be responsible for transmitting instructions containing instruction streams to sequencer module 82.

Figure 5:
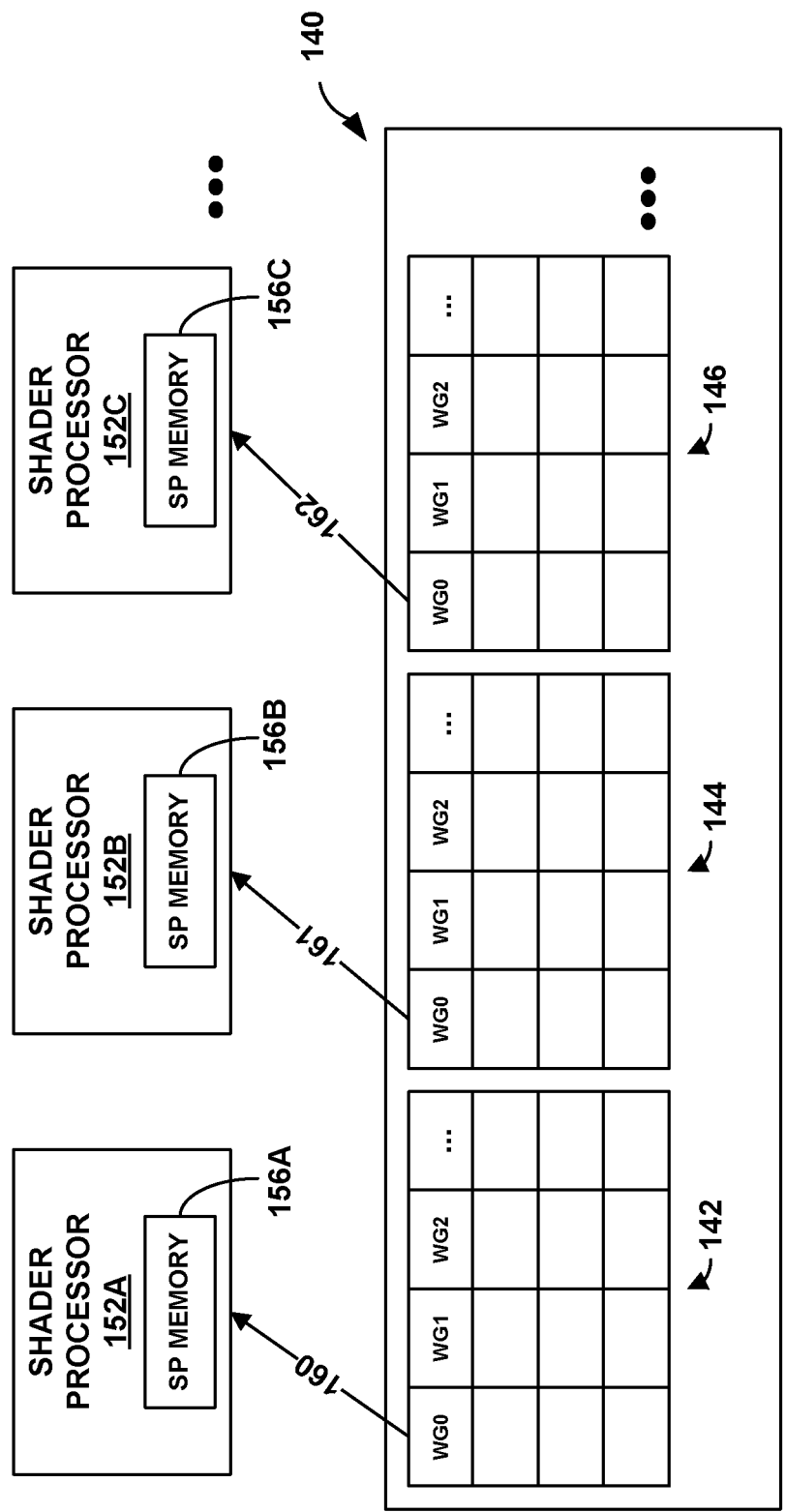
FIG. 5 is a block diagram illustrating an example of a sequencer module that is configured to distribute workgroups of a first kernel, a second kernel, and a third kernel 146, according to aspects of the disclosure.

FIG. 5 is a block diagram illustrating an example of a sequencer module 140 distributing workgroups of a first kernel 142, a second kernel 144, and a third kernel 146 to a first SP 152A having a first SP memory 156A, a second SP 152B having a second SP memory 156B, and a third SP 152C having a third SP memory 156C (collectively SPs 152 and SP memories 156). According to some aspects of the disclosure, sequencer module 140 and SPs 152 may be incorporated in a GPU, such as GPU 48 shown in FIG. 1 or GPU 60 shown in FIG. 4.

Sequencer module 140 and SPs 152 may be configured similarly to, or the same as sequencer module 82 and SPs 76 shown and described with respect to FIG. 4. For example, sequencer module 140 may be responsible for controlling instruction and data flow within a GPU. Sequencer module 140 may include a combination of fixed function and programmable components for distributing work items and workgroups to SPs 152 and associated SP memories 156.

Sequencer module 140 distributes workgroups of kernels 142-146 in a fixed distribution pattern, without controlling the specific destination of the workgroups of different kernels. For example, sequencer module 140 distributes workgroups of the first kernel 142 by sequentially distributing a first workgroup WG0 to SP 152A (as represented by line 160), a second workgroup WG1 to SP 152B (as represented by line 161), a third workgroup WG2 to SP 152C (as represented by line 162), and so on until the first kernel 142 has been distributed and executed. Sequencer module 140 then moves on to the second kernel 144 and the third kernel 146 and distributes those workgroups to the SPs 152. For example, the sequencer module 140 may continue in the fixed distribution pattern and may distribute all of the workgroups of the second kernel 144 among the SPs 152. Sequencer module 140 then may proceed to the third kernel 146 and distribute all of the workgroups of the third kernel 146 among the SPs 152.

Without the ability to control which SP 152 executes a particular workgroup, the data associated with workgroups may be required to be loaded into more than one of the SP memories 156. As shown in the example of FIG. 5, in following the fixed distribution pattern, after processing the entire first kernel 142, $m$ sequencer module 140 distributes workgroup WG0 of the second kernel 144 to SP 152B (line 161). Accordingly, the input data associated with WG0 must be loaded into SP memory 156B. In addition, after processing the entire second kernel 144, due to the fixed nature of the distribution pattern, sequencer module 140 distributes workgroup WG0 of the third kernel 146 to SP 152C (line 162). Accordingly, the input data associated with WG0 is loaded into SP memory 156C.

As described above with respect to FIG. 4, the data associated with a particular workgroup typically must be loaded into local memory of an SP before the SP can execute the workgroup. Without the ability to control which SP 152 executes a particular workgroup, data associated with the workgroups cannot be shared between kernels. In the example shown in FIG. 5, the data associated with workgroup WG0 must be loaded into each of the SP memories 156A, 156B, and 156C at different times prior to processing by the SPs 152A-152C. Accordingly, the memory bandwidth for the SPs 152 is equal to three times the input data for each kernel.

Figure 6:
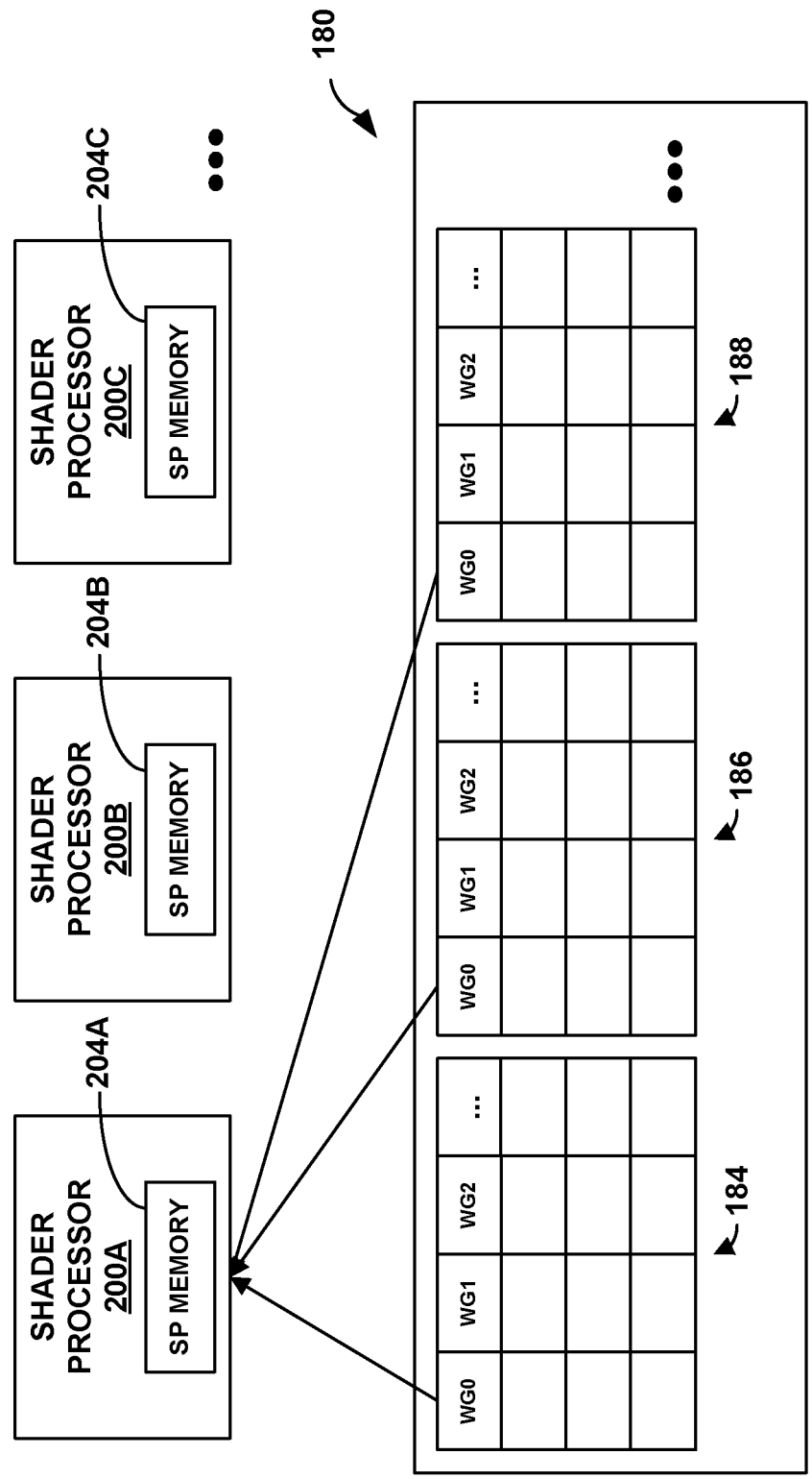
FIG. 6 is a block diagram illustrating an example of a sequencer module that is configured to distribute workgroups of a first kernel, a second kernel, and a third kernel, according to aspects of the disclosure.

FIG. 6 is a block diagram illustrating an example of a sequencer module 180 distributing workgroups of a first kernel 184, a second kernel 186, and a third kernel 188 to a first SP 200A having a first SP memory 204A, a second SP 200B having a second SP memory 204B, and a third SP 200C having a third SP memory 204C (collectively SPs 200 and SP memories 204). According to some aspects of the disclosure, sequencer module 180 and SPs 200 may be incorporated in a GPU, such as GPU 48 shown in FIG. 1 or GPU 60 shown in FIG. 4.

Sequencer module 180 and SPs 200 may be configured similarly to, or the same as sequencer module 82 and SPs 76 shown and described with respect to FIG. 4. For example, sequencer module 180 may be responsible for controlling instruction and data flow within a GPU. Sequencer module 180 may include a combination of fixed function and programmable components for distributing work items and workgroups to SP memories 204 for execution by the SPs 200.

According to some aspects of the disclosure, sequencer module 82 distributes workgroups of kernels 184-188 according to predefined instructions that designate workgroups to instruction streams. For example, sequencer module 82 may be configured to receive instruction streams that tie workgroups of different kernels together so that they are executed by the same SP. Accordingly, rather than distributing workgroups of kernels 184-188 in a fixed pattern (as shown, for example, in FIG. 5), sequencer module 180 may be configured to distribute workgroups based on the instruction streams that tie workgroups of the kernels together.

In the example shown in FIG. 6, sequencer module 180 executes an instruction stream that ties workgroup WG0 of kernel 184 to workgroup WG0 of kernel 186, and to workgroup WG0 of kernel 188. The workgroups WG0 of the kernels 184-186 are all associated with the same input data. By executing the instruction stream, workgroup WG0 of the kernels 184-188 are sequentially processed using SP 200A. Accordingly, the input data associated with WG0, which may be the same among kernels 184-188, can be shared among the workgroups WG0 of kernels 184-188. For example, the data associated with workgroup WG0 can be loaded into SP memory 204A, when processing WG0 of kernel 184, and shared by WG0 of kernel 186 and WG0 of kernel 188.

Retaining data in SP memory 204A and sharing that data among multiple workgroups provides efficient management of SP memory 204A. For example, rather than having to fetch and transfer new data into SP memory 204A after every execution of a workgroup, the data can remain in SP memory 204A and be shared by multiple workgroups of multiple kernels. Accordingly, local memory bandwidth consumption may be reduced. In the three-kernel example shown in FIG. 6, local memory bandwidth consumption is reduced by two thirds, compared to the three-kernel example shown in FIG. 5.

According to some examples of the disclosure, the local memory bandwidth savings associated with executing instruction streams also provides a time savings. For example, while the SPs 200 may perform the same number of calculations associated with the workgroups as a system that does not utilize instruction streams to execute a given program, time savings may be achieved because less data must be transferred between a GPU global memory and SP memories 204. Data transfer between GPU global memory and SP memories 204 may be a relatively time intensive process that introduces a bottleneck into the process of executing the kernels 184-188. Accordingly, reducing the amount of data that is required to be transferred between GPU global memory and SP memories 204 also reduces the bottleneck associated with data transfer between GPU global memory and SP memories 204.

Figure 7:
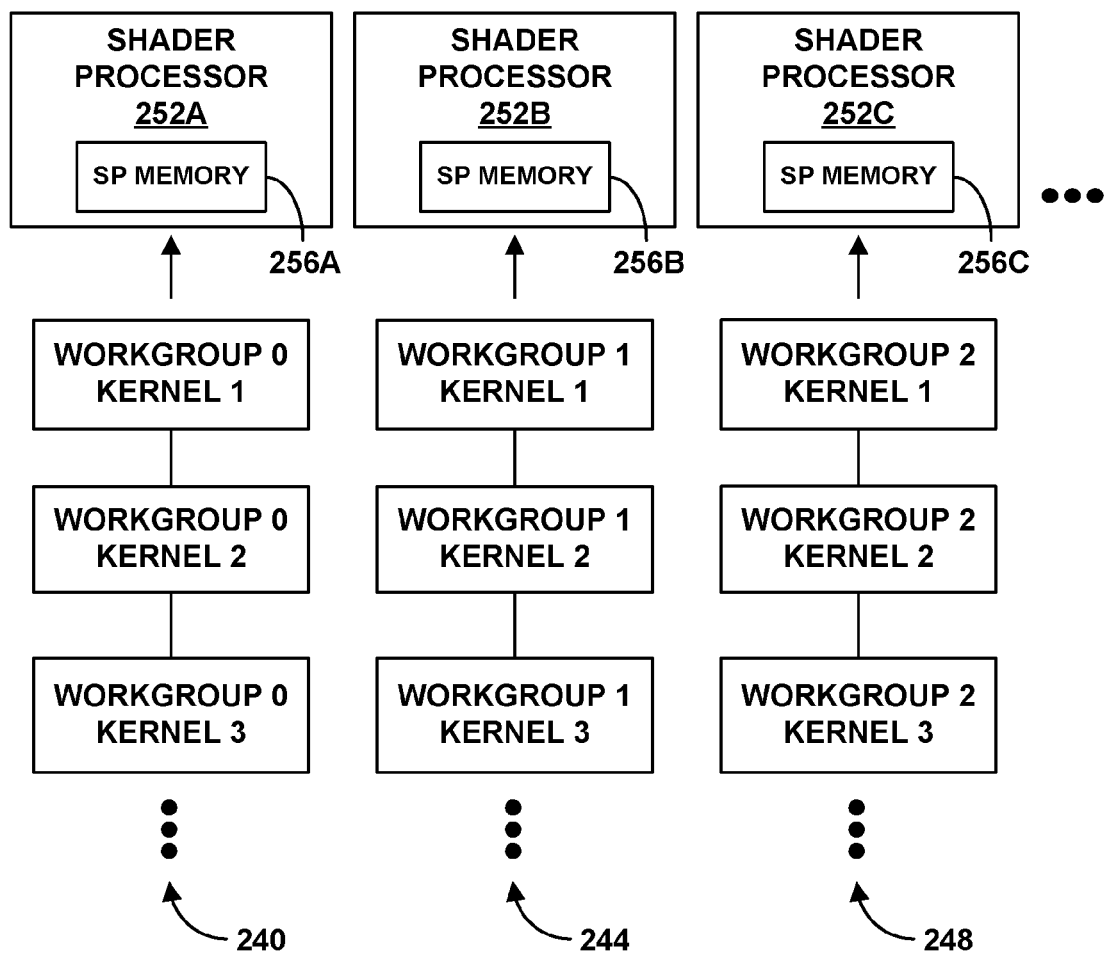
FIG. 7 is a block diagram illustrating an example of assigning streams of execution orders, according to aspects of the disclosure.

FIG. 7 is a block diagram illustrating an example of assigning streams of execution orders 240, 244, and 248 to a first SP 252A having a first SP memory 256A, a second SP 252B having a second SP memory 256B, and a third SP 252C having a third SP memory 256C (collectively SPs 252 and SP memories 256). According to some aspects of the disclosure, the SPs 252 may be incorporated in a GPU, such as GPU 48 shown in FIG. 1 or GPU 60 shown in FIG. 4.

The example shown in FIG. 7 includes three SPs 252 executing workgroups associated with three kernels. It should be appreciated, however, that streams of execution orders may be implemented in systems having more or fewer SPs than those shown in FIG. 7 (e.g., 2 SPs, 10 SPs, 100s of SPs). In addition, streams of execution orders may link more or fewer workgroups and kernels together than the three shown in FIG. 7.

The streams of execution orders, or instruction streams 240-248, may be assigned to SPs 252 by a sequencer module, such as the sequencer module 82 shown in FIG. 4. The instruction streams 240-248 virtually ties workgroups of different kernels together so that they are processed by the same SP. For example, as shown in FIG. 7, instruction stream 240 links Workgroup 0 of kernel 1 to Workgroup 0 of kernel 2 and Workgroup 0 of kernel 3. Likewise, instruction stream 244 links Workgroup 1 of kernel 1 to Workgroup 1 of kernel 2 and Workgroup 1 of kernel 3, and instruction stream 248 links Workgroup 2 of kernel 1 to Workgroup 2 of kernel 2 and Workgroup 2 of kernel 3

In the example shown in FIG. 7, at least some of the input data associated with the like-numbered workgroups is consistent. For example, the input data associated with Workgroup 0 of kernel 1 is the same as, or has at least some overlap with, the input data associated with Workgroup 0 of kernel 2 and Workgroup 0 of kernel 3. Accordingly, SP 252A can execute instruction stream 240 by loading the input data associated with Workgroup 0 into SP memory 256A and sharing that input data when executing Workgroup 0 of kernel 1, Workgroup 0 of kernel 2, and Workgroup 0 of kernel 3. In this way, executing instruction stream 240 reduces the amount of data that is required to be transferred into and out of SP memory 256A during execution of kernels 1, 2, and 3. Similar operations may be carried out for SP 252B and SP memory 256B, and for SP 252C and SP memory 256C.

Figure 8:
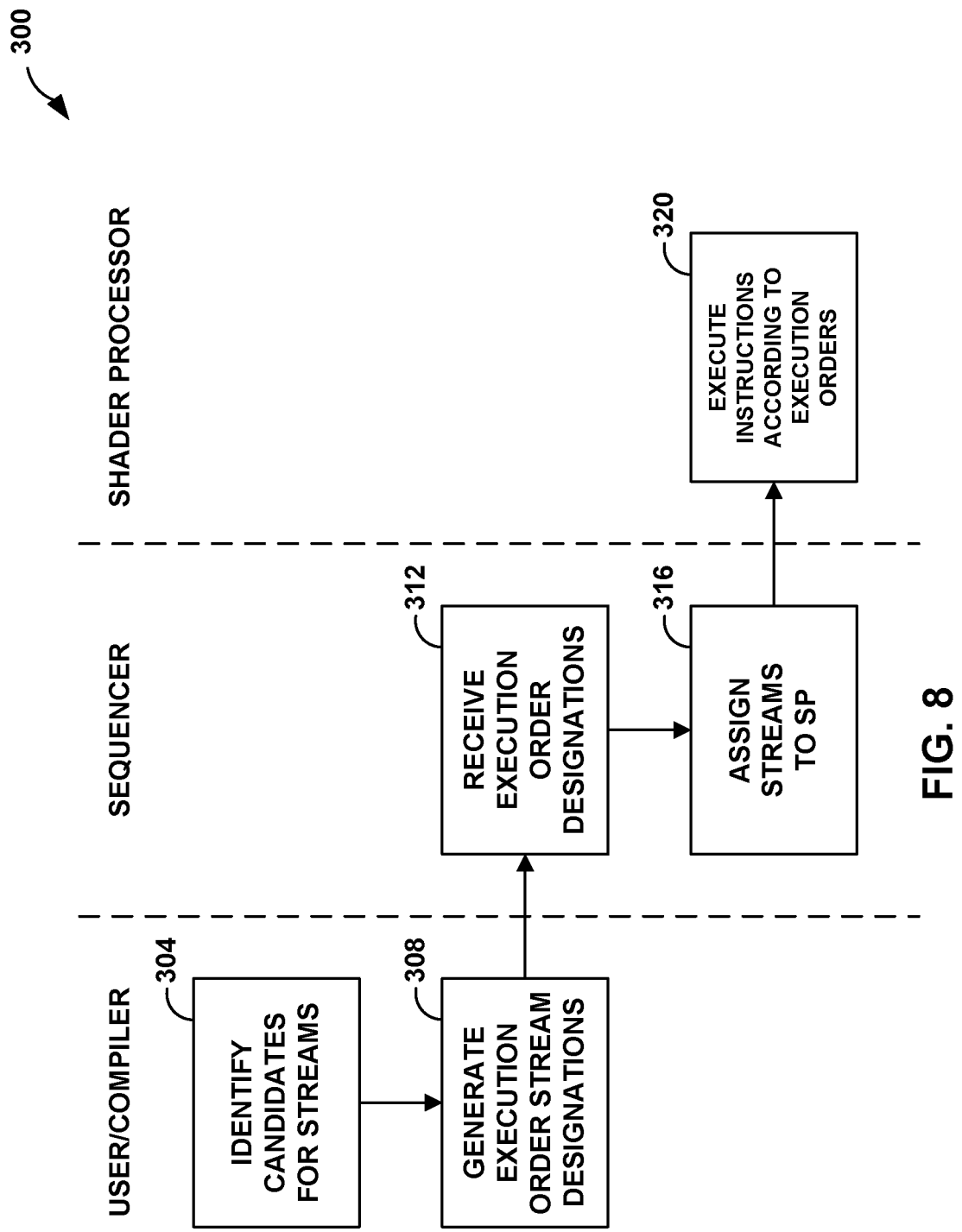
FIG. 8 is a flow chart illustrating a method of generating and executing one or more streams of execution orders, according to aspects of the disclosure.

FIG. 8 is a flow chart illustrating a method 300 of generating and executing execution orders (e.g., "instruction streams"), such as streams 240-248 shown in FIG. 7. According to some aspects of the disclosure, method 300 may be carried out by a GPU, such as GPU 48 shown in FIG. 1 or GPU 60 shown in FIG. 4. For purposes of illustration only, portions of the method 300 may be described as being carried out by the example GPU 60 shown in FIG. 4.

As shown in FIG. 8 candidates for execution order streams are initially identified (304). According to some aspects, a user identifies candidate kernels that would benefit from utilizing instruction streams. For example, a user may identify kernels that utilize the same input data multiple times. In another example, a program, such as a compiler program, may identify candidate kernels that would benefit from implementing instruction streams. For example, a complier program may monitor memory access patterns and identify input data that is used by more than one kernel. When input data is used by more than one kernel of a program, an instruction stream may be implemented to tie the workgroups that utilize the same data such that those workgroups are executed by the same SP. Utilizing instruction streams in this way may help to manage local memory resources of SPs by reducing the number of times input data needs to be loaded into the local memory resources. For example, input data can be loaded into local memory of an SP once and shared among multiple workgroups of multiple kernels.

After candidates have been identified, execution order stream designations are generated (308). A user may define instruction streams using an API adapted to include instruction stream commands. For example, APIs such as OpenGL, CUDA, DirectX, or any other API for creating GPU programs can be adapted to include one or more commands that allow a user to designate workgroups and their associated kernels to instruction streams. In another example, a program, such as a complier program, may automatically generate instruction streams after identifying repeated memory access patterns.

After the instruction streams are generated, the execution order designations are transmitted to and received by a GPU, such as GPU 60 (312). In some examples, sequencer module 82 may receive input defining execution order streams that include one or more kernel designations and one or more workgroup designations. The instruction streams may be transmitted to sequencer module 82 by a host processor of a computing device, such as host processor 24 shown in FIG. 1. In examples in which GPU 60 is a distinct device (e.g., not included in a computing device having a host processor) another processing component may be responsible for receiving the instruction streams and transmitting them to sequencer module 82.

Sequencer module 82 may implement the execution orders by assigning the streams to SPs, such as SPs 76 (316). For example, sequencer module 82 may assign workgroups designated in an instruction stream to be executed by the same SP of GPU 60. SPs execute the instruction streams by executing the instructions designated in the in the execution orders (320). For example, an SP sequentially executes the workgroups designated in the instruction stream. By doing so, input data associated with the workgroups designated in the instruction stream can be shared among the workgroups designated in the instruction stream. Executing the instruction streams may reduce the amount of data that is required to be transferred between GPU memory 72 and SP memories 78, and reduce the overall time required to execute a particular program.

In the examples provided above, the instruction streams are described as tying workgroups of different kernels together so that the workgroups of the different kernels are executed consecutively by the same SP. Tying the workgroups of different kernels together in this way aids in managing the memory resources associated with the SPs because the data associated with the workgroups can be shared by multiple kernels. It should be understood, however, that the term "workgroup" refers generically to a group of instructions. For example, a "workgroup" may be referred to in Compute Unified Device Architecture ("CUDA" developed by NVIDIA Corporation, version 3.2 released Sep. 17, 2010) as a "thread block."

It should also be understood that the workgroup and kernel designations are provided as an example only. The memory management aspects of the disclosure may be applied to other configurations of GPU applications. For example, other GPU applications may include a single relatively larger "kernel" that includes instructions that use the same input data more than once during execution. In such an example, aspects of the disclosure may still be applied to manage memory resources. Instruction streams may be created that tie the instructions together the use the same input data, despite the instructions belonging to the same kernel.

In one or more examples, the functions described may be implemented in hardware, software executed on hardware, firmware executed on hardware, or any combination thereof. In some examples, instructions stored on a computer-readable media may cause the hardware components to perform their respective functions described above. The computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Combinations of the above should also be included within the scope of computer-readable media.

The code may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined by a collection of interoperative hardware units, including one or more processors as described above, in conjunction with suitable software and/or firmware.

Various examples have been described. These and other examples are within the scope of the following claims.

The invention claimed is:

1. A method of processing data with a graphics processing unit (GPU), the method comprising:
receiving execution orders for a first shader processor of a plurality of shader processors, wherein the execution orders comprise a plurality of kernel designations and a plurality of workgroup designations of workgroups included in the designated kernels, and wherein the execution orders virtually link workgroups of kernels identified in the plurality of workgroup designations and the plurality of kernel designations to operate on input data associated with the received execution orders;
assigning workgroups of kernels identified in the plurality of workgroup designations and the plurality of kernel designations to the first shader processor of the plurality of shader processors;
storing the input data to memory of the first shader processor; and
serially executing, by the first shader processor of the plurality of shader processors, the virtually linked workgroups, including sharing the input data stored to the memory of the first shader processor during execution of the virtually linked workgroups and without storing other input data to the memory of the first shader processor during execution of the virtually linked workgroups.

2. The method of claim 1, wherein the plurality of kernel designations identify a plurality of kernels, and wherein each kernel of the plurality of kernels defines a function carried out by the GPU.

3. The method of claim 1, wherein the plurality of workgroup designations identify a plurality of workgroups, and wherein each workgroup of the plurality of workgroups comprises instructions that are executed on the input data by the GPU.

4. The method of claim 1, wherein the execution orders virtually link a first workgroup of a first kernel to a first workgroup of a second kernel, wherein the first workgroup of the first kernel and the first workgroup of the second kernel operate on the input data.

5. The method of claim 4, wherein serially executing the execution orders comprises executing, by the first shader processor, the first workgroup of the second kernel after the first workgroup of the first kernel.

6. The method of claim 1, wherein the input data is associated with a group of pixels of an image, such that the execution orders virtually link the workgroups to operate on the group of pixels.

7. The method of claim 6, wherein serially executing the virtually linked workgroups comprises serially executing the virtually linked workgroups without storing other input data associated with another group of pixels of the image to the memory.

8. The method of claim 1, further comprising, in response to user input, generating the input defining the execution orders using an application programming interface (API).

9. A graphics processing unit (GPU) comprising:
a sequencer module configured to receive execution orders for a first shader processor of a plurality of shader processors, wherein the execution orders comprise a plurality of kernel designations and a plurality of workgroup designations of workgroups included in the designated kernels, and wherein the execution orders virtually link workgroups of kernels identified in the plurality of workgroup designations and the plurality of kernel designations to operate on input data associated with the received execution orders;
wherein the sequencer module is configured to assign workgroups of kernels identified in the plurality of workgroup designations and the plurality of kernel designations to the first shader processor of the plurality of shader processors;
wherein the first shader processor comprises a memory configured to store the input data; and
wherein the first shader processor of the plurality of shader processors is configured to serially execute the virtually linked workgroups, including sharing the input data stored to the memory of the first shader processor during execution of the virtually linked workgroups and without storing other input data to the memory of the first shader processor during execution of the virtually linked workgroups.

10. The GPU of claim 9, wherein the plurality of kernel designations identify a plurality of kernels, and wherein each kernel of the plurality of kernels defines a function carried out by the GPU.

11. The GPU of claim 9, wherein the plurality of workgroup designations identify a plurality of workgroups, and wherein each workgroup of the plurality of workgroups comprises instructions that are executed on the input data by the GPU.

12. The GPU of claim 9, wherein the execution orders virtually link a first workgroup of a first kernel to a first workgroup of a second kernel, wherein the first workgroup of the first kernel and the first workgroup of the second kernel operate on the input data.

13. The GPU of claim 12, wherein the first shader processor is further configured to serially execute the first workgroup of the second kernel after the first workgroup of the first kernel.

14. The GPU of claim 9, wherein the input data is associated with a group of pixels of an image, such that the execution orders virtually link the workgroups to operate on the group of pixels.

15. The GPU of claim 14, wherein to serially execute the virtually linked workgroups, the first shader processor is configured to serially execute the virtually linked workgroups without storing other input data associated with another group of pixels of the image to the memory.

16. A graphics processing unit (GPU) comprising:
means for receiving execution orders for a first shader processor of a plurality of shader processors, wherein the execution orders comprise a plurality of kernel designations and a plurality of workgroup designations of workgroups included in the designated kernels, and wherein the execution orders virtually link workgroups of kernels identified in the plurality of workgroup designations and the plurality of kernel designations to operate on input data associated with the received execution orders;
means for assigning workgroups of kernels identified in the plurality of workgroup designations and the plurality of kernel designations to the first shader processor of the plurality of shader processors; and
means for storing the input data to memory of the first shader processor;
means for serially executing the virtually linked workgroups, including means for sharing the input data stored to the memory of the first shader processor during execution of the virtually linked workgroups and without storing other input data to the memory of the first shader processor during execution of the virtually linked workgroups.

17. The GPU of claim 16, wherein the plurality of kernel designations identify a plurality of kernels, and wherein each kernel of the plurality of kernels defines a function carried out by the GPU.

18. The GPU of claim 16, wherein the plurality of workgroup designations identify a plurality of workgroups, and wherein each workgroup of the plurality of workgroups comprises instructions that are executed on the input data by the GPU.

19. The GPU of claim 16, wherein the execution orders virtually link a first workgroup of a first kernel to a first workgroup of a second kernel, wherein the first workgroup of the first kernel and the first workgroup of the second kernel operate on the input data.

20. The GPU of claim 19, wherein the means for serially executing is further configured to execute the first workgroup of the second kernel after the first workgroup of the first kernel.

21. The GPU of claim 16, wherein the means for sharing the input data is associated with a group of pixels of an image, such that the execution orders virtually link the workgroups to operate on the group of pixels.

22. The GPU of claim 21, wherein the means for serially executing the virtually linked workgroups comprises means for serially executing the virtually linked workgroups without storing other input data associated with another group of pixels of the image to the memory.

23. A non-transitory computer-readable storage medium encoded with instructions for causing one or more programmable processors of a computing device having a graphics processing unit (GPU) to:
receive execution orders for a first shader processor of a plurality of shader processors, wherein the execution orders comprise a plurality of kernel designations and a plurality of workgroup designations of workgroups included in the designated kernels, and wherein the execution orders virtually link workgroups of kernels identified in the plurality of workgroup designations and the plurality of kernel designations to operate on input data associated with the received execution orders;
assign workgroups of kernels identified in the plurality of workgroup designations and the plurality of kernel designations to the first shader processor of the plurality of shader processors;
store the input data to memory of the first shader processor; and
serially execute, by the first shader processor of the plurality of shader processors, the virtually linked workgroups, including sharing the input data stored to the memory of the first shader processor during execution of the virtually linked workgroups and without storing other input data to the memory of the first shader processor during execution of the virtually linked workgroups.

24. The non-transitory computer-readable storage medium of claim 23, wherein the plurality of kernel designations identify a plurality of kernels, and wherein each kernel of the plurality of kernels defines a function carried out by the GPU.

25. The non-transitory computer-readable storage medium of claim 23, wherein the plurality of workgroup designations identify a plurality of workgroups, and wherein each workgroup of the plurality of workgroups comprises instructions that are executed on the input data by the GPU.

26. The non-transitory computer-readable storage medium of claim 23, wherein the execution orders virtually link a first workgroup of a first kernel to a first workgroup of a second kernel, wherein the first workgroup of the first kernel and the first workgroup of the second kernel operate on the input data.

27. The non-transitory computer-readable storage medium of claim 26, wherein serially executing the execution orders comprises executing, by the first shader processor, the first workgroup of the second kernel after the first workgroup of the first kernel.

28. The non-transitory computer-readable storage medium of claim 23, wherein the input data is associated with a group of pixels of an image, such that the execution orders virtually link the workgroups to operate on the group of pixels.

29. The non-transitory computer-readable storage medium of claim 28, wherein to serially execute the virtually linked workgroups, the instructions cause the one or more programmable processors to serially execute the virtually linked workgroups without storing other input data associated with another group of pixels of the image to the memory.

* * * * *